(12) United States Patent
Goto

(10) Patent No.: US 6,537,390 B1
(45) Date of Patent: Mar. 25, 2003

(54) ANTIFRICTION BEARING

(75) Inventor: Masao Goto, Habikino (JP)

(73) Assignee: Koyo Seiko Co., Ltd., Osaka (JP)

( * ) Notice: Subject to any disclaimer, the term of this patent is extended or adjusted under 35 U.S.C. 154(b) by 19 days.

(21) Appl. No.: 09/708,075

(22) Filed: Nov. 8, 2000

(30) Foreign Application Priority Data

Nov. 11, 1999 (JP) .......................... 11-320556

(51) Int. Cl.$^7$ .......................... C23C 8/22; F16C 33/58
(52) U.S. Cl. .......................... 148/319; 148/906
(58) Field of Search .......................... 148/319, 906

(56) References Cited

U.S. PATENT DOCUMENTS 6,251,197 B1 * 6/2001 Toda .......................... 148/319

FOREIGN PATENT DOCUMENTS

| JP | 51 95070 | * | 8/1993 |
| JP | 60 17225 | * | 1/1994 |
| JP | 7-41934 | | 2/1995 |
| JP | 2000087213 | * | 3/2000 |

OTHER PUBLICATIONS

Patent Abstracts of Japan No. 07–041934 dated Feb. 2, 1995.

* cited by examiner

Primary Examiner—Sikyin Ip
(74) Attorney, Agent, or Firm—Jacobson Holman PLLC

(57) ABSTRACT

An antifriction bearing comprises bearing rings and rolling members which are made from a steel material containing 0.15 to 0.3 wt. % of carbon by being subjected to heat treatments including carburizing. The surface layer of raceway surface of each of the bearing rings and the surface layer of rolling surface of each of the rolling members are 1.0 to 1.5 wt. % in carbon content, 64 to 66 in Rockwell hardness C, 150 to 2000 MPa in compressive residual stress, up to 3 μm in maximum carbide particle size and 10 to 25% in carbide area ratio, at a depth of 0 to 50 μm as measured from the outermost surface of the surface layer. The surface layers are 0.75 to 1.3 wt. % in carbon content, 150 to 1000 MPa in compressive residual stress, 25 to 45% in residual austenite content, up to 1 μm in maximum carbide particle size and up to 15% in carbide area ratio, at a depth of 50 to 200 μm as similarly measured from the outermost surface. The bearing is given a prolonged life for use in clean oils and also in oils contaminated with extraneous matter.

6 Claims, No Drawings

ANTIFRICTION BEARING

BACKGROUND OF THE INVENTION

The present invention relates to antifriction bearings, and more particularly to antifriction bearings which are suitable for use in an oil contaminated with extraneous matter.

Antifriction bearings for use in oils contaminated with extraneous matter include those already known and comprising bearing rings and rolling members which are made from a steel material containing 0.5 to 1.2 wt. % of carbon and 0.7 to 3.0 wt. % of chromium and which are subjected to a carburizing treatment. The surface layer portion of the raceway surface of each of the bearing rings and the surface layer portion of the rolling surface of each of the rolling members are 1.5 to 3.0 wt. % in carbon content and at least 63 in Rockwell hardness C and include a carburized layer which contains carbides precipitating in the form of fine globular particles, up to 10 μm in diameter, in an amount of 15 to 80% in terms of area ratio. The matrix of the carburized layer has a carbon content of 0.6 to 0.7 wt. % see JP-A No. 41934/1995).

However, it has been found that the conventional antifriction bearing described fails to have a satisfactory service life since antifriction bearings are used under conditions of ever-increasing severity in recent years.

DISCLOSURE OF THE INVENTION

An object of the present invention is to overcome the above problem and to provide an antifriction bearing having a longer life than in the prior art.

The present invention provides an antifriction bearing comprising bearing rings and rolling members which are made from a steel material containing 0.15 to 0.3 wt. % of carbon by being subjected to heat treatments including carburizing, a surface layer of raceway surface of each of the bearing rings and a surface layer of rolling surface of each of the rolling members being 1.0 to 1.5 wt. % in carbon content, 64 to 66 in Rockwell hardness C, 150 to 2000 MPa in compressive residual stress, up to 3 μm in maximum carbide particle size and 10 to 25% in carbide area ratio, at a depth of 0 to 50 μm as measured from the outermost surface of the surface layer, the surface layers being 0.75 to 1.3 wt. % in carbon content, 150 to 1000 MPa in compressive residual stress, 25 to 45% in residual austenite content, up to 1 μm in maximum carbide particle size and up to 15% in carbide area ratio, at a depth of 50 to a/5 μm (wherein a is the effective case depth in μm) as measured similarly.

The steel material to be used is, for example, one containing 0.15 to 0.3 wt. % of carbon, 1.2 to 1.6 wt. % of chromium, 0.35 to 0.55 wt. % of silicon and 0.35 to 0.65 wt. % of manganese, the balance being iron and inevitable impurities.

The antifriction bearing of the present invention has a prolonged life in clean oils and also in oils contaminated with extraneous matter.

DESCRIPTION OF THE PREFERRED EMBODIMENT

The steel material serving as the blank material for the antifriction bearing of the present invention should be limited to 0.15 to 0.3 wt. % in carbon content for the following reason. The process of carburizing followed by quenching serves to produce a difference in carbon content between the carburized surface layer and the blank material to thereby assure the antifriction bearing of required compressive residual stress due to transformation during quenching. If the carbon content of the steel blank material is less than 0.15 wt. %, the internal hardness required of the antifriction bearing is not available, whereas if the content is in excess of 0.3 wt. %, the above-mentioned compressive residual stress due to transformation during carburizing and quenching will diminish. Accordingly the carbon content to be determined of the steel blank material should be within the range of 0.15 to 0.3 wt. %.

In the antifriction bearing of the present invention, the surface layer of raceway surface of the bearing ring and the surface layer of rolling surface of the rolling member should be 1.0 to 1.5 wt. % in carbon content, 64 to 66 in Rockwell hardness C, 150 to 2000 MPa in compressive residual stress, up to 3 μm in maximum carbide particle size and 10 to 25% in carbide area ratio at a depth of 0 to 50 μm as measured from the outermost surface the surface layer, in order to give the antifriction bearing the required rolling fatigue resistance, wear resistance and impression resistance. Stated more specifically, if the carbon content is less than 1.0 wt. %, the compressive residual stress is below 150 MPa or the maximum carbide particle size is in excess of 3 μm, the required rolling fatigue resistance is not available, whereas even if the carbon content is n excess of 1.5 wt. % or the compressive residual tress exceeds 2000 MPa, the effect to improve the rolling fatigue resistance will level off, failing to produce increased resistance. Further when the Rockwell hardness C is less than 64, the required impression resistance will not be obtained, whereas if the hardness exceeds 66, the effect to improve the impression resistance will level off without increasing further. Further if the carbide area ratio is less than 10%, the required wear resistance is not available, whereas even if the ratio is in excess of 25%, the effect to improve the wear resistance will level off, failing to give higher resistance. Incidentally, the carbon content of the surface layer at the depth of 0 to 50 μm as measured from the outermost surface thereof is the combined amount of the carbon contained in the carbide precipitates and the carbon contained in the matrix.

With the antifriction bearing of the present invention, the surface layer of raceway surface of the bearing ring and the surface layer of rolling surface of the rolling member should be 0.75 to 1.3 wt. % in carbon content, 150 to 1000 MPa in compressive residual stress, 25 to 45% in residual austenite content, up to 1 μm in maximum carbide particle size and up to 15% in carbide area ratio at a depth of 50 to a/5 μm (wherein a is the effective case depth in μm) as measured from the outermost surface of the surface layer, in order to give an improved rolling fatigue life to the antifriction bearing. More specifically stated, if the carbon content, the compressive residual stress and the residual austenite content are less than the respective lower limit values, the required rolling fatigue life is not available, whereas if these values are in excess of the respective upper limits, the effect to improve the rolling fatigue life will level off, failing to give a further prolonged life. Especially, the residual austenite affords improved toughness when in an amount of 25 to 45%, exerting a favorable influence on the rolling fatigue life. More preferably, the residual austenite content is 25 to 35%. While nonmetallic inclusions frequently provide starting points of spalling due to rolling fatigue, coarse carbide particles can also be starting points of spalling, so that the carbide particles are limited in size and amount. Especially it is more preferable that the carbide area ratio be up to 7%. In the case where the surface layer of raceway surface of the bearing ring of the antifriction bearing and the surface layer of rolling surface of the rolling member thereof contain such carbide particles as mentioned above at a depth of 0 to 50 μm as measured from the outermost surface of the surface layer, it is actually impossible to reduce the carbide content to zero at a depth of 50 to a/5 μm (wherein a is the effective case depth in μm) as measured similarly. However, it is desirable that the carbide content be zero if possible. Incidentally, the carbon content of the surface layer at the depth of 50 to a/5 μm (wherein a is the effective case depth in μm) as measured from the outermost surface thereof is the combined amount of the carbon contained in the carbide precipitates and the carbon contained in the matrix.

EXAMPLES

Example 1

Blanks for the rings of tapered roller bearings and blanks for the rollers of the bearings were prepared from a steel material containing 0.2 wt. % of carbon, 0.4 wt. % of silicon, 0.5 wt. % of manganese and 1.4 wt. % of chromium, the balance being iron and inevitable impurities. These blanks were subjected to a first carburizing-quenching treatment by heating at 930° C. for 5 hours and subsequent quenching to 80° C. in oil, a second carburizing-quenching treatment by heating at 840° C. for 5 hours and subsequent quenching to 80° C. in oil, and a tempering treatment by heating at 160° C. for 2 hours and subsequent cooling in air. The two carburizing-quenching treatments were 1.25 in carbon potential. The surface of each of the blanks was then ground so that the effective case depth a would be 1000 μm. In this way, tapered roller bearing rings and rollers were prepared and then assembled into tapered roller bearings.

Example 2

Tapered roller bearings were assembled in the same manner as in Example 1 except that the heating time for the second carburizing-quenching treatment was 3 hours.

Comparative Example 1

Tapered roller bearings were assembled in the same manner as in Example 1 with the exception of conducting a carburizing-quenching treatment only once by heating at 930° C. for 5 hours and subsequent quenching to 80° C. in oil, and thereafter conducting a tempering treatment by heating at 160° C. for 2 hours and subsequent cooling in air.

Comparative Example 2

Tapered roller bearings were assembled in the same manner as in Example 1 with the exception of using a steel material containing 0.4 wt. % of carbon, 0.4 wt. % of silicon, 0.5 wt. % of manganese and 1.4 wt. % of chromium, the balance being iron and inevitable impurities.

Comparative Example 3

Tapered roller bearings were assembled in the same manner as in Example 1 except that the carburizing-quenching treatments were conducted with a carbon potential of 1.0.

Table 1 shows the surface hardness and internal hardness of the tapered roller bearing rings and rollers of Examples 1 and 2 and Comparative Examples 1 to 3, the carbon content, compressive residual stress, maximum carbide particle size and carbide area ratio of these bearing components at a depth of 0 to 50 μm as measured from the outermost surface of the component, and the carbon content, compressive residual stress, residual austenite content and maximum carbide particle size of the bearing components at a depth of 50 to 200 (a/5) μm as measured from the outermost surface of the component. Incidentally the carbide area ratio is the value of an optional portion with an area of 0.1 mm$^2$.

TABLE 1

|  | Example | | Comp. Ex. | | |
| --- | --- | --- | --- | --- | --- |
|  | 1 | 2 | 1 | 2 | 3 |
| Carbon content of blank wt. % | 0.2 | 0.2 | 0.2 | 0.4 | 0.2 |
| Surface hardness HRC | 65 | 65 | 62 | 65 | 63 |
| Internal hardness HRC | 46 | 45 | 45 | 54 | 44 |
| Outermost surface to 50 μm | | | | | |
| Compressive residual stress MPa | 200–220 | 230–250 | 150–160 | 130–140 | 190–210 |
| Carbon content wt. % | 1.3–1.4 | 1.2–1.3 | 0.9–0.95 | 1.3–1.4 | 1.0–1.3 |
| Max. carbide particle size μm | 2.5 | 2.0 | No carbide | 3.5 | 2.3 |
| Carbide area ratio % | 13 | 11 | " | 14 | 11 |
| 50 to 200 μm | | | | | |
| Compressive residual stress MPa | 180–200 | 200–230 | 140–150 | 90–130 | 160–190 |
| Carbon content wt. % | 0.9–1.3 | 0.8–1.2 | 0.7–0.95 | 0.9–1.3 | 0.7–1.0 |
| Residual austenite content % | 35 | 30 | 22 | 33 | 27 |
| Max. carbide particle size μm | 0.8 | 0.6 | No carbide | 1.1 | 0.7 |
| Carbide area ratio % | 7 | 3 | " | 10 | 6 |
| Life ratio in clean oil | 5 | 7 | 1 | 0.9 | 1.5 |
| Life ratio in contaminated oil | 17 | 15 | 1 | 13 | 3 |

The surface hardness and internal hardness given in Table 1 are each in terms of Rockwell hardness C. The surface hardness is that of the component at a depth of up to 50 μm as measured from the outermost surface thereof. The internal hardness is the hardness of the portion other than the carburized layer.

Evaluation Test

The tapered roller bearings of Examples 1 and 2 and Comparative Examples 1 to 3 were tested for life in clean oil and contaminated oil. The life test in clean oil was conducted in a bath of gear oil. The life test in contaminated oil was conducted under the conditions of an equivalent radial load of 0.45 C (wherein C is the load rating) and a speed of rotation of 2000 rpm using a lubricant prepared by admixing with 1 liter of gear oil 1.1 g of extraneous matter having a mean particle size of 27 μm, maximum particle size of 50 μm and surface hardness of 65 in terms of Rockwell hardness C. Table 1 also: shows the test results. The life ratio in Table 1 is a value relative to the life of the bearing of Comparative Example 1 which was taken as 1.

Table 1 reveals that the tapered roller bearings of Examples 1 and 2 exhibit a longer life both in clean oil and in contaminated oil than the bearing (of Comparative Example 1) which is lower in surface hardness, free from carbide precipitates and lower in carbon content at the depth of 0 to 50 μm, the bearing (of Comparative Example 2) which is lower in the carbon content of the steel blank material and smaller in the compressive residual stress at the depth of 0 to 50 μm, contains coarser carbide particles at the same depth, has a smaller compressive residual stress and lower residual austenite content at the depth of 50 to 200 (a/5) μm and is higher in carbide area ratio, and the bearing (of Comparative Example 3) which is smaller in surface hardness.

What is claimed is:

1. An antifriction bearing comprising bearing rings and rolling members which are made from a steel material containing 0.15 to 0.3 wt. % of carbon by being subjected to heat treatments including carburizing, a surface layer of raceway surface of each of the bearing rings and a surface layer of rolling surface of each of the rolling members being 1.0 to 1.5 wt. % in carbon content, 64 to 66 in Rockwell hardness C, 150 to 2000 MPa in compressive residual stress, up to 3 μm in maximum carbide particle size and 10 to 25% in carbide area ratio, at a depth of 0 to 50 μm as measured from the outermost surface of the surface layer, the surface layers being 0.75 to 1.3 wt. % in carbon content, 150 to 1000 MPa in compressive residual stress, 25 to 45% in residual austenite content, up to 1 μm in maximum carbide particle size and up to 15% in carbide area ratio, at a depth of 50 to a/5 μm, wherein a is the effective case depth in μm, as measured from the outermost surface of the surface layer.

2. An antifriction bearing according to claim 1 wherein the steel material contains 0.15 to 0.3 wt. % of carbon, 1.2 to 1.6 wt. % of chromium, 0.35 to 0.55 wt. % of silicon and 0.35 to 0.65 wt. % of manganese, the balance being iron and inevitable impurities.

3. An antifriction bearing according to claim 1 wherein the surface layer of raceway surface of each bearing ring and the surface layer of rolling surface of each rolling member are up to 7% in carbide area ratio at the depth of 50 to a/5 μm μm as measured from the outermost surface of the surface layer.

4. An antifriction bearing according to claim 1 wherein the surface layer of raceway surface of each bearing ring and the surface layer of rolling surface of each rolling member are 25 to 35% in residual austenite content at the depth of 50 to a/5 μm μm as measured from the outermost surface of the surface layer.

5. An antifriction bearing according to claim 1 wherein bearing rings and rolling members are made by being subjected to a first carburizing-quenching treatment, a second carburizing-quenching treatment and a tempering treatment.

6. An antifriction bearing according to claim 5 wherein the heating temperature of a second carburizing-quenching treatment is lower than that of a first carburizing-quenching treatment.

* * * * *